Aug. 5, 1969 G. W. ZIEGLER, JR 3,460,072

TRANSMISSION LINE COMPENSATION FOR HIGH FREQUENCY DEVICES

Filed June 16, 1967 3 Sheets-Sheet 1

Aug. 5, 1969 G. W. ZIEGLER, JR 3,460,072

TRANSMISSION LINE COMPENSATION FOR HIGH FREQUENCY DEVICES

Filed June 16, 1967 3 Sheets-Sheet 3

United States Patent Office 3,460,072

Patented Aug. 5, 1969

3,460,072

TRANSMISSION LINE COMPENSATION FOR HIGH FREQUENCY DEVICES

George William Ziegler, Jr., Carlisle, Pa., assignor to AMP Incorporated, Harrisburg, Pa.

Filed June 16, 1967, Ser. No. 646,718
Int. Cl. H03h 7/38, 7/04
U.S. Cl. 333—33 10 Claims

ABSTRACT OF THE DISCLOSURE

Broad band compensation for high frequency coaxial lines is provided by arranging adjacent line zones of electrical lengths $S_1$, $S_2$ and $S_1'$ and of effective dielectric constants $K_1$, $K_2$ and $K_1'$ so that $$S_1\sqrt{K_1}=S_2\sqrt{K_2}=S_1'\sqrt{K_1'};$$

Figure 1A:
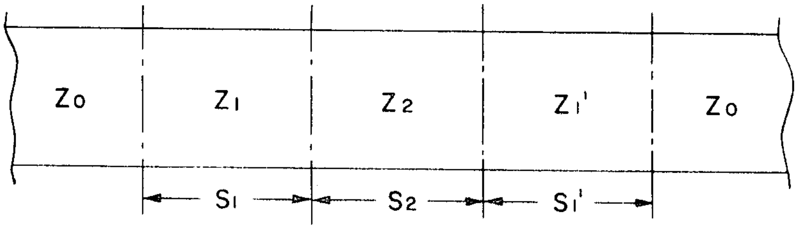

where the characteristic impedances $Z_1$, $Z_2$, $Z_1'$ of such zones is made to yield $Z_1Z_2=Z_1'Z_2=Z_0^2$, $Z_0$ being the characteristic impedance of the line. Various embodiments are disclosed to accommodate coaxial lines having high or low characteristic impedance mismatch both with and without the presence of discontinuity capacitances.

BACKGROUND OF THE INVENTION

With compensation techniques heretofore known it has not been considered practical to compensate for a single characteristic impedance mismatch over any extended frequency range much above a half kilomegacycle (0.5 gHz.).

One known technique lumps susceptances to define what is known as quarter wave length transformation for matching loads to a matched condition but the match provided is only at one frequency and the technique is therefor frequency sensitive and not truly broadband.

Another compensating scheme which has been used in the past and is disclosed in U.S. Patent No. 2,540,012 to Dr. O. M. Salati employs an averaging out of characteristic impedances with high and low sections made of a length to provide a match to the characteristic impedance of the line used. The Salati patent disclosure teaches that the effective length of the connector is preferably inappreciable in relation to the wave length of the wave signal to be translated by the signal line, which placed an upper limit of less than 0.5 gHz. on the technique.

The so called Griemsmann's compensation which is disclosed in the publication "Handbook of Design and Performance of Cable Connectors for Microwave Use," J. W. Griemsmann, Bureau of Ship's Index No. NE–110718, May, 1956, is limited by the requirement that there must be a definite discontinuity and further by the requirement that a single discontinuity be compensated by matching sections for only a single frequency.

In my own early filed application S.N. No. 276,714 filed Apr. 30, 1963, now U.S. Patent No. 3,350,666 and titled Coaxial Connector, a discontinuity is also present.

In summary of the background of the present invention, compensation techniques heretofore known are either not capable of effecting a broadband compensation or require the presence of discontinuities and therefor are not applicable in applications wherein mismatch occurs solely by reason of change in characteristic impedance.

SUMMARY

The present invention relates to means and methods for compensating coaxial lines over a broadband of high frequency signals.

It is an object of the present invention to provide means and a method for compensating for one or more mismatch conditions caused by mechanical or electrical design requirements in a coaxial line which may or may not have discontinuity capacitances therein.

It is a further object to provide broadband compensation to coaxial lines having mismatch sections therein caused by electrical or mechanical design requirements wherein no physical discontinuity causing a discontinuity capacitance is permitted.

It is another object of the invention to provide a method of broadband compensation which is relatively insensitive to frequency range or to specific frequencies.

It is yet another object of the invention to provide an inexpensive, simple and effective technique of providing broadband compensation to coaxial devices which must be used in the kilomegacycle frequency range.

It is still another object of the invention to provide a broadband compensator for areas of high or low characteristic impedance caused by mechanical or electrical design requirements.

It is still another object of the invention to provide a cheap and inexpensive broadband compensator wherein the compensation is carried out by dielectric bead shaping and not in the metallic parts of the connector device.

The foregoing problems with prior art compensation are overcome and the foregoing objectives of the present invention are attained through my discovery that frequency independent compensation can be provided by a balancing of length and dielectric constant variables in a given section of coaxial line. Considering that the coaxial line has a characteristic impedance $Z_0$, compensation may be provided for a high characteristic impedance zone or for a low characteristic impedance zone through a compensator made up of three zones of lengths $S_1$, $S_2$, and $S_1'$ each having an effective dielectric constant along such length of $K_1$, $K_2$ and $K_1'$ where the relationship is $Z_1Z_2=Z_1'Z_2=Z_0^2$, and $S_1\sqrt{K_1}=S_2\sqrt{K_2}=S_1'\sqrt{K_1'}$.

The length $S_2$ may be considered to be the problem zone having either a high or a low characteristic impedance $Z_2$ caused by some mechanical or electrical design requirement. Working with the variables in terms of lengths S and effective dielectric constants K, compensators can be designed which meet the foregoing relationship without requiring the presence of a discontinuity capacitance. Alternatively, the techniques herein disclosed may be used where discontinuity capacitances are necessarily present by using the method of the invention in conjunction with standard methods.

The invention method is taught in conjunction with a number of distinct embodiments representing transmission lines per se as well as coaxial devices which are intended to represent coaxial connectors, adaptors, loads and other apparatus required to operate in the kilomegacycle frequency range.

IN THE DRAWINGS

Figure 1B:
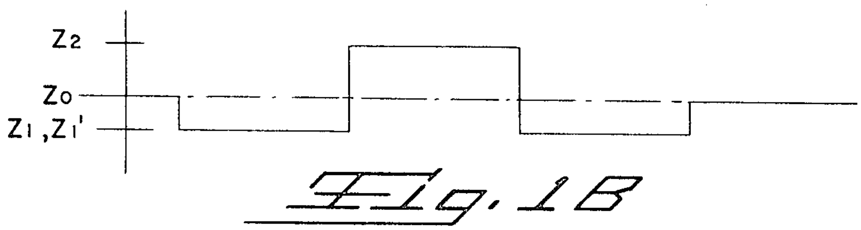
Figure 1C:
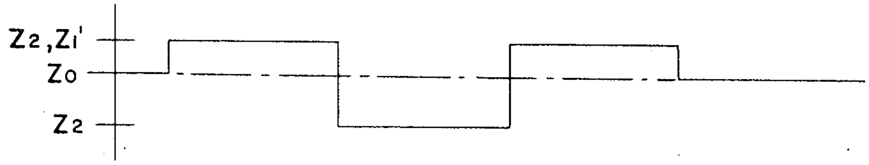
Figures 2A, 2B, 2C:
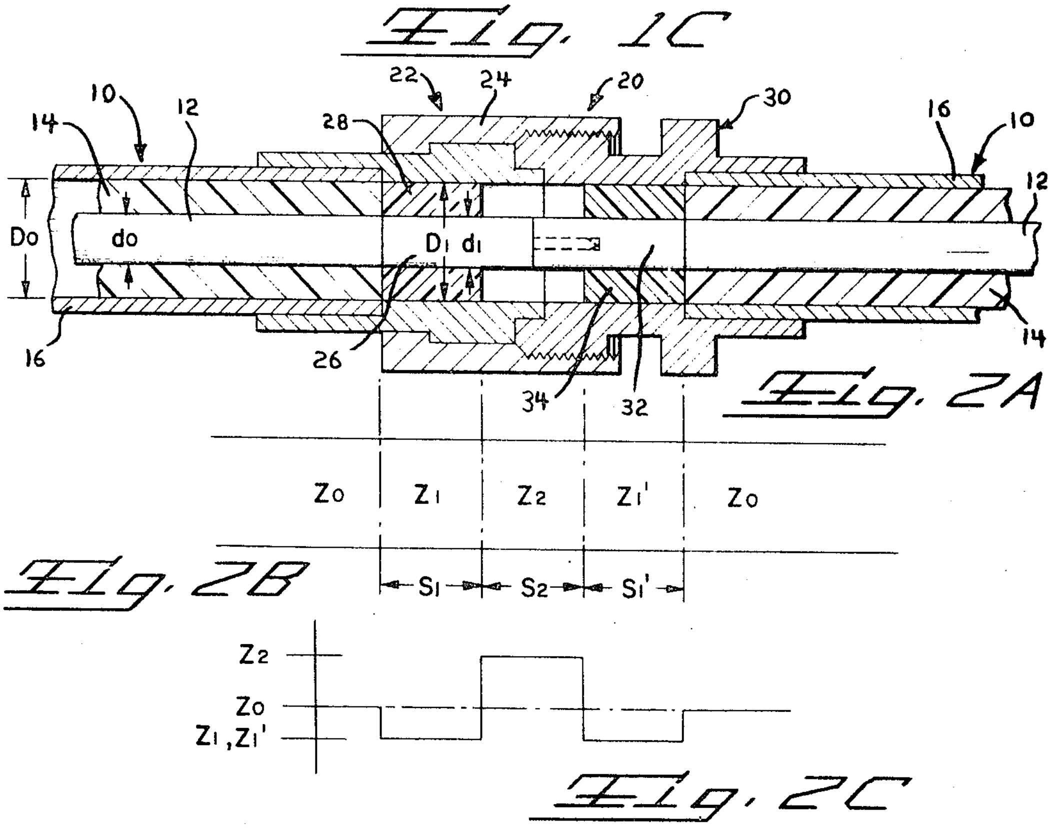
Figures 3A, 3B, 3C, 4A, 4B, 4C:
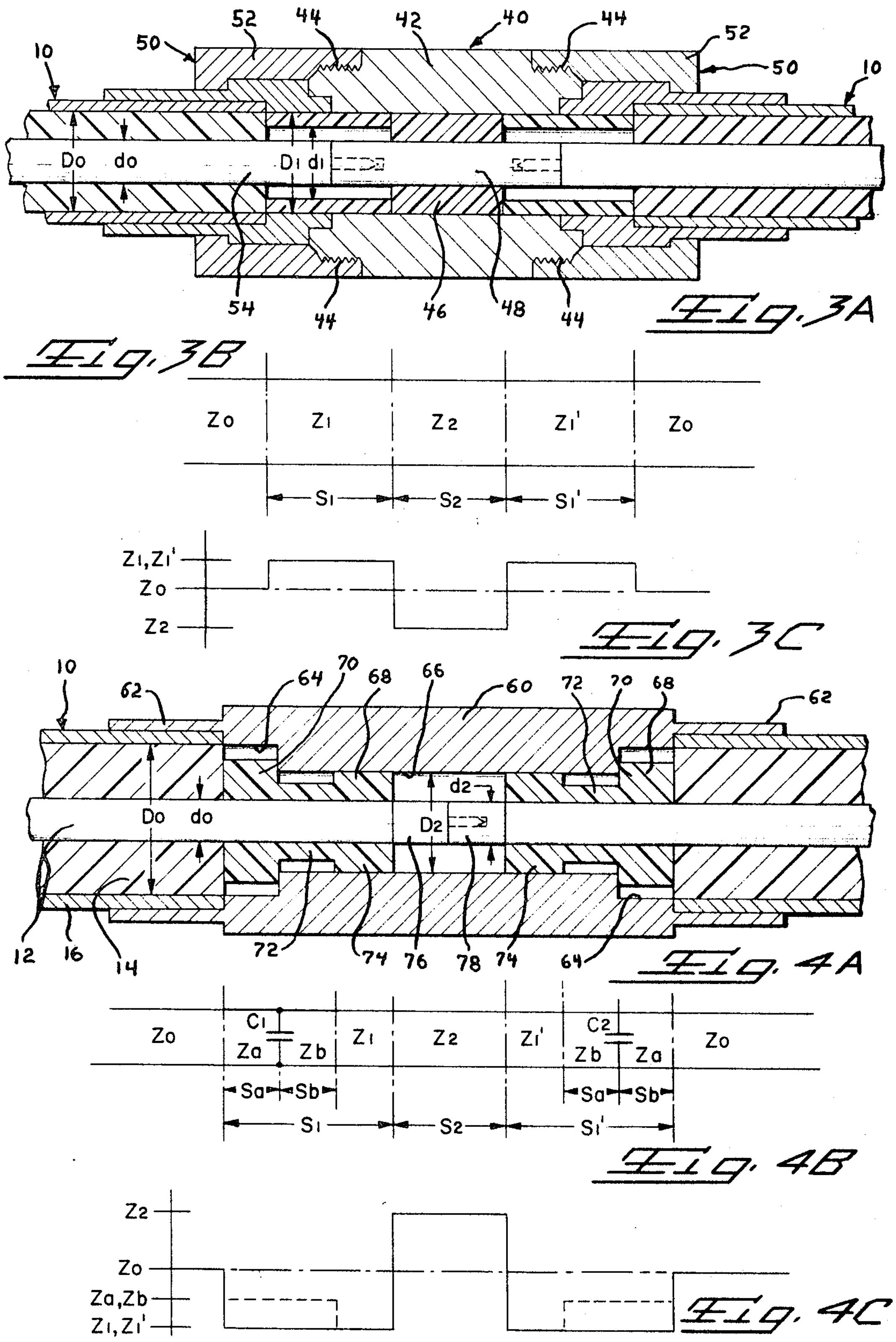
Figures 5A, 5B, 5C:
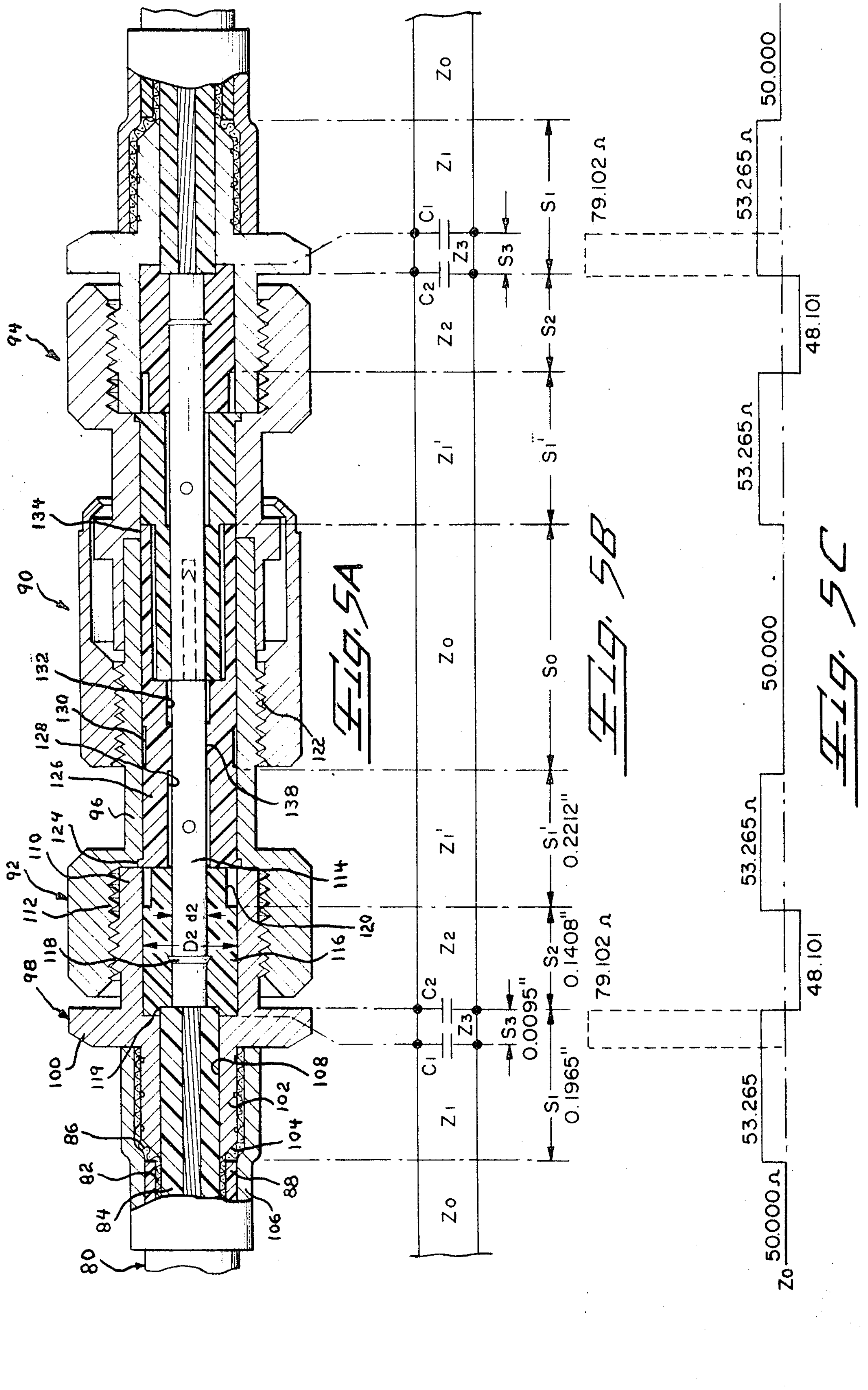

FIGURE 1*a* is a schematic representation of a transverse line and FIGURES 1*b* and 1*c* are, respectively, of characteristic impedance levels for low-high-low and for high-low-high characteristic impedance zones therefor;

FIGURE 2*a* is a longitudinal sectional view of a coaxial device in a connector embodiment having no conductor diameter discontinuities therein but having a high characteristic impedance zone in the center thereof compensated by the technique of the invention and a structure made in accordance therewith;

FIGURES 2*b* and 2*c*, respectively, schematic diagrams representing impedance, length quantities and impedance levels for compensation of the device of FIGURE 2*a*;

FIGURE 3*a* is a longitudinal sectional view of a coaxial device in a connector embodiment having no conductor diameter discontinuities but having a low characteristic impedance zone in the center thereof compensated in accordance with another aspect of the invention;

FIGURES 3*b* and 3*c*, are, respectively, schematic representations of impedance, length values and of impedance levels present in the compensation provided in the structure of FIGURE 3*a*;

FIGURE 4*a* is a longitudinal section of a coaxial device in a splice embodiment having an abrupt outer conductor diameter change creating discontinuities and compensated in accordance with the technique of the invention;

FIGURES 4*b* and 4*c* are, respectively, schematic representations of impedance, length values, and impedance levels for the structure shown in FIGURE 4*a*;

FIGURE 5*a* is an 8 to 1 scale view, in section, of a coaxial device in a connector embodiment having abrupt diameter changes therein and utilizing the techniques of the invention to provide compensation to two distinct parts of a connector device; and FIGURES 5*b* and 5*c* are, respectively, schematic representations of length values and impedance levels for the structure shown in FIGURE 5*a*.

Referring now to FIGURE 1*a* the representation therein may be considered as a length of coaxial transmission line terminated at either end to a coaxial line or device such as a generator or load of characteristic impedance $Z_0$. The zone shown of characteristic impedance $Z_2$ and of electrical lengths $S_2$ may be considered as the problem zone of high or low characteristic impedance (relative to $Z_0$) created by electrical or mechanical design requirements. Design requirements which set up this type of problem can be caused by any number of considerations.

For example, it may be necessary to provide a type of sealing in the zone of $S_2$ which calls for material having a dielectric constant drastically different from that of the medium defining the dielectric material in the cable having the characteristic impedance $Z_0$. In one known application the problem was caused by the requirement for sealing (without conductor diameter changes) in a gas loaded line required to operate at temperatures in excess of that possible with the more standard dielectric materials such as Teflon or polyethylene. A ceramic material having a dielectric constant exceeding 4.0 was called for and even though laminated radially with air the effective dielectric constant was high and this meant that $Z_2$ would have to be considerably lower than $Z_0$.

In another application the zone $S_2$ was required to be free of any solid dielectric material for mateability of parts and access, with the adjacent segments having a solid dielectric material for support of the center conductor. The coaxial line used in such application had a foamed dielectric material and the presence of air in the zone $S_2$ created a high Z segment requiring compensation. In both the foregoing applications designs requirements precluded the presence of a distinct discontinuity capacitance or capacitances utilized by previously known compensation techniques including that of Griesmann and that disclosed in my application S.N. 276,714 previously mentioned.

In working with problems created by the situations like that above mentioned I have discovered a way to provide frequency independent compensation over a broad range of signalling frequencies. I have discovered that in a situation wherein there is a high or low characteristic impedance zone ($Z_2$ of length $S_2$ and effective dielectric constant $K_2$), broadband compensation can be provided by arranging adjacent zones ($Z_1$, $Z_1'$ of lengths $S_1$, $S_1'$ and effective dielectric constants $K_1$, $K_1'$) as in FIGURE 1*a* with the parameters S and K adjusted so as to maintain the relationship:

$$Z_1 Z_2 = Z_2 Z_1' = Z_0^2 \qquad \text{(Equation 1)}$$

and the relationship:

$$S_1\sqrt{K_1} = S_2\sqrt{K_2} = S_1'\sqrt{K_1'} \qquad \text{(Equation 2)}$$

The length S may be considered as electrical or physical lengths.

FIGURE 1*b* represents generally the invention solution to a high Z zone problem and FIGURE 1*c* represents treatment of a low Z problem. As a preferred practice where possible the zones adjacent to $Z_2$ are made identical with $S_1=S_1'$ and $K_1=K_1'$. It is contemplated that at times this will not be possible and that separate calculations for the S and K parameters in adjacent zones will have to be made.

Turning now to specific examples using the invention technique, FIGURES 2*a–c* and 3*a–c* represent connectors having high and low Z zones, respectively, with adjacent zones selected for broadband compensation.

In FIGURE 2*a* a connector 20 is shown joining coaxial cables 10 to define a coaxial path therebetween. The cable 10 includes a center conductor 12, which may be solid or tubular copper rod; a solid dielectric material 14 such as foamed polyethylene; and a solid tubular outer conductor 16, such as aluminum tubing. The connector 20 is comprised of a plug half 22 having a rotatable and interiorly threaded nut 24 mounted thereon and having a center contact member 26 supported within a dielectric insert 28. The jack half shown as 30 includes a forward portion threaded to mate with the threading of 24 and includes a center contact receptacle 32 supported by a dielectric insert 34. It may be assumed that the center region of the connector must be free of solid dielectric material for purposes of intermating of the contact members and mating with other coaxial devices of a fixed design. Each of the connector halves may be considered to have an inner bore equal to the inner diameter $D_0$ of the cable outer conductor 16 and the contact members 26 and 32 may be considered to have an outer diameter equal to the outer diameter of the center conductor 12 shown as $d_0$. The connector halves may be considered to be terminated to the outer and inner conductive portions of the cable by any suitable means.

From the foregoing it will be immediately apparent that the center section of the connector must have a characteristic impedance $Z_2$ which is greater than the characteristic impedance $Z_0$ of the cable. The expression for characteristic impedance is:

$$Z_0 = \frac{139.05}{\sqrt{K}} \log_{10} \frac{D_o}{d_o} \qquad \text{(Equation 3)}$$

Since $D_0$ and $d_0$ are known and the dielectric material is air ($K_2=1$), the quantity $Z_2$ can be readily calculated. Once it is calculated the quantity for $Z_1=Z_1'$ can be calculated from the relationship which must be maintained, $Z_1Z_2=Z_0^2$ ($Z_0$ being that of the cable). Once $Z_1$ is known the method of the invention may proceed by an adjustment of the remaining variables $S_1$, $K_1$ and $S_1'$, $K_1'$, relative to the variable $S_2$ and the fixed quantity $K_2$. In the foregoing problem $S_2$ may be selected to be long enough to provide a physical length to meet the design requirements calling for a center segment which is free of solid dielectric material and is practically manufacturable. This will yield the quantity $S_2\sqrt{K_2}$. With this known, $K_1$ and $K_1'$ may be selected from available dielectric materials with $S_1=S_1'$ being calculated to provide quantities $S_1\sqrt{K_1}=S_1'\sqrt{K_1'}$ which equals the quantity $S_2\sqrt{K_2}$.

As an example of the foregoing, let it be assumed that a connector of the general configuration of FIGURE 2*a* is to be designed for use with a standard ⅜" cable of $D_0=0.325''$, $d_0=0.117''$, $Z_0=50\Omega$; with no changes in diameter permitted and with a solid insert in each half, 22 and 30.

From Equation 3

$$Z_2 = \frac{138}{\sqrt{K_2}} \log_{10} \frac{D_0}{d_0}$$

we may solve for $Z_2$; K being air in the zone $S_2$ so that $K_2=1.0$.

$$Z_2=\frac{138.05}{\sqrt{I_2}}\,\frac{0.325}{0.117}=138.05\ (.4437)=61.25\Omega$$

From the relationship (Equation 1)

$$Z_1Z_2=Z_1'Z_2=Z_0^2$$

we find that $$Z_1=Z_1'=\frac{2500}{61.25}=40.81\Omega$$

From Equation 3, transposing $$K_1=\left[\frac{138.05}{Z_1}\log_{10}\frac{0.325}{0.117}\right]^2=\left[\frac{138.05}{40.81}\ (.4437)\right]^2=2.252$$

Now, $K_2$, $K_1$ and (assuming equal adjacent zones) $K_1'$ are known and the equality $Z_1Z_2=Z_1'Z_2=Z_0^2$ is established. We may therefore proceed to ascertain $S_1$, $S_2$ and $S_1'$ to satisfy the relationship of Equation 2:

$$S_1\sqrt{K_1}=S_2\sqrt{K_2}=S_1'\sqrt{K_1'}$$

We first select some practical length for $S_2$ to permit mating and easy manufacture. A length equal to $D_0$ may be appropriate for a given connector design.

Thus, $$S_2\sqrt{K_2}=0.325\sqrt{1}=0.325\text{ inch}$$

and $$S_1=\frac{0.325}{\sqrt{K_1}}=\frac{0.325}{1.5}=0.217\text{ inch}$$

a length which is practical and manufacturable. We now have all of the design parameters for a connector compensation which is theoretically frequency independent, the actual device being subject only to manufacturing tolerances.

In the preceding example $K_1$ was determined to be 2.252 which is close to a commercially available polyethylene of K=2.26. If no seal is required an insert of this material can be made to yield an effective dielectric constant by an adjustment of radial thickness to introduce air and drop the dielectric constant slightly from that of a solid insert at 2.26. An expression for a composite bead of outer diameter $D_1$ and inner diameter $d_1$ in terms of $K_p$ (plastic) and $K_a$ (air) is $$\log_{10}\frac{D_1}{d_1}=\left(\frac{K_p}{K_p-K_a}\right)\left(1-\frac{1}{K_1}\right)\log\frac{D_0}{d_0}=\left(\frac{2.26}{1.26}\right)$$

$$\left(1-\frac{1}{2.25}\right)(0.4437)=0.442$$

$$\frac{D_1}{d_1}=2.770$$

Making $d_1=0.117$ inch, $D_1=0.3241$ inch.

Practically this means turning one thousandths off the outside radial thickness of the inserts 28 and 32.

FIG. 3*a* shows a coaxial connector embodiment for connecting cables 10 of a construction similar to that previously described. The connector device shown as 40 is comprised of a center receptacle 42 having an outer conductive sleeve threaded at each end as at 44 and having disposed in the center thereof a dielectric insert 46 carrying a double ended contact receptacle member 48. Plugged into each end of receptacle 42 is a plug half shown as 50 including an outer nut member 52 interiorally threaded to mate with 42 and having a center contact member of 54 secured to the center conductor of the cable and supported thereby. Again, the plug halves may be terminated to the cable in any suitable fashion with respect to the outer conductor thereof. Assuming that it is required that a seal be provided in the center of the device of a material different from 14 (more dense) to adequately support the receptacle center contact member 48, we find that there will be a center zone $S_2$ having characteristic impedance $Z_2$ which is different (lower) from the characteristic impedance $Z_0$ of the line. In accordance with the invention zones on each side of $S_2$ are provided having characteristic impedances Z and lengths S to maintain the relationship previously given. In the situation of FIGURE 3*a* the length $S_2$ must be made sufficiently long to provide a physical length adequately supporting a center contact member 48. This length will again be chosen to be practically manufacturable. With $K_2$ also selected, $Z_2$ can be calculated along with $Z_1=Z_1'$, the quantity $S_2\sqrt{K_2}$ can also be calculated and therefore the quantities $S_1\sqrt{K_1}$ and $S_1'\sqrt{K_1'}$ can be calculated followed by a calculation of the individual parameters.

As an example of the foregoing let it again be assumed that a connector of the general configuration of FIGURE 3*a* is to be designed for a standard ⅜" cable of $D_0=0.325''$, $d_0=0.117''$, $Z_0=50\Omega$; with no changes in diameter permitted and with a solid sealing and supporting insert in center of the connector like 46.

Using a Teflon material, $K_2=2.05$, Equation 3 yields $$Z_2=\frac{138.05}{\sqrt{2.05}}\log_{10}\frac{0.325}{0.117}=42.78\Omega$$

and Equation 1 yields, $$Z_1=Z_1'=\frac{2500}{42.78}=58.44\Omega$$

From Equation 3

$$K_1=K_1'=\left[\frac{(138.05)(0.4437)}{58.44}\right]^2=1.099$$

A composite bead in zones $S_1$ and $S_1'$ may be developed with $D_1$ being the insert outer diameter and *d*1 being the insert inner diameter $$\log_{10}\frac{D_1}{d_1}=\frac{2.05}{1.05}\left(1-\frac{1}{1.099}\right)(0.4437)=0.0778$$

and $$\frac{D_1}{d_1}=1.196$$

Making $D_1=0.325$ inch, $d_1$ becomes 0.272 inch.

Again, arbitrarily, making $$S_2=0.325\text{ inch } S_2\sqrt{K_2}=0.325\ (1.43)=0.465$$

and $$S_1=\frac{0.465}{\sqrt{1.099}}=0.434\text{ inch}$$

and $$S_1=0.434\text{ inch}$$

In the two previously described embodiments a solution for $S_1$ has been indicated. It should be readily apparent from the equations previously given how a solution for $S_2$ can be obtained assuming some practical value for $S_1$ or how solutions for K values could be made assuming or having fixed the electrical lengths S. In both of the previously described embodiments it was convenient to make the values $S_1$ and $S_1'$ equal and to make the values for $K_1$ and $K_1'$ equal. It should be apparent from the relationship that this equality is not necessary and that $S_1$ might be made different from $S_1'$ with a suitable adjustment of $K_1'$ relative to $K_1$ to maintain the relationship $S_1\sqrt{K_1}=S_1'\sqrt{K_1'}$. The relationship $Z_1=Z_1'$ must, of course, still be maintained.

In both of the previous embodiments compensation has been provided without resort to the imposition of a discontinuity capacitance, or, at least without the presence thereof. The invention method and means is however amenable to applications wherein a discontinuity capacitance is present. FIGURE 4*a* shows an embodiment which may be considered as a connector splice or some kind of bulkhead fitting requiring that the dielectric insert be locked against axial displacement away from the cable of use. The splice is comprised of a metallic outer cylinder shown as 60 having outboard end portions 62 which are fitted over the outer conductor of a cable 10 and terminated thereto by any suitable means. The cylinder includes an interior bore stepped as shown to include end bore segments 64 having an inner diameter equal to the inner diameter $D_0$ of the cable outer conductor and a center bore shown as 66 of a diameter less than $D_0$. Fitted within the bores of 60 at each end is a dielectric insert shown as 68, with regard to the left hand insert. The insert includes a first enlarged portion shown as 70, a reduced center portion 72 and a support portion 74 of a diameter to engage the inner bore 66. The inserts are spaced apart to provide air in the center of the splice with a mating of center conductive members shown as 76 and 78. The device is assembled by dressing the cable with a portion of the center conductor extending forwardly and with a center conductive member affixed thereto in any suitable fashion as by drilling, tapping or by crimping in a standard manner. The cable is then inserted into the splice with the center contact member being poked through the insert and supported thereby. The portion 70 of each insert prevents axial displacement of the insert within the bore of 60, displacement toward the cable being blocked by an engagement of the insert portion 70 with the dielectric material of the cable. As can be discerned it is apparent that the center segment of length $S_2$ has a characteristic impedance $Z_2$ which differs from the characteristic impedance $Z_0$ of the cable and that discontinuities are present at the step between bores 64 and 66.

FIGURE 4*b* shows schematically the transmission path of FIGURE 4*a* broken down into a segments with impedance and length values assigned. In accordance with the invention approach the discontinuity capacitances shown as $C_1$ and $C_2$ represented by the change in diameter of the bore of 60 must be dealt with first. As can be discerned $C_1$ is equal to $C_2$. Accordingly, the dielectric bead structures can be identical and the impedance and electrical length parameters can also be identical. A calculation which is good for the left end of the structure involving the bead numbered 74 will therefore be good for the right hand bead structure of the device 60.

Following the invention technique $Z_2$ is calculated from Equation 3, using $K_2=1.0$ and known values for $D_2$ and $d_2$. Next, $Z_1$ and $Z_1'$ are calculated from Equation 1 and $K_1$ is caculated for the portion of $S_1$ where the insert 74 is solid. Selecting a practical value for $S_2$ then permits a calculation for $S_1$ from Equation 2. With $Z_1$, $K_1$ and $S_1$ known, compensation for $C_1$ may be made by calculating $S_a$ and $S_b$, $Z_a$ and $Z_b$ to compensate the zones therefore to $Z_1$ rather than to $Z_0$. This compensation may be by any suitable approach or as preferred in the manner taught in my application S.N. 403,900, filed Oct. 14, 1964 and titled High Frequency Transmission Devices and Methods of Compensation. In terms of the equations of my application S.N. 403,900 compensation would be made through admittance values Y for a compensation to $Y_1$.

FIGURE 4*c* shows in solid lines the compensated impedance levels in the length $S_a$ and $S_b$ and dotted in it shows the effective Z level including the capacitance.

A compensation for $C_2$ would be identical for that of $C_1$ and accordingly with $Z_1$ and $Z_1'$ quantities known calculations can be made for $S_1$ and $S_1'$ in the manner treated above.

In the previous examples the invention technique has been presented in terms of absolute relationships. It is to be understood that in practice production tolerances of conductive and dielectric elements will render actual embodiments which approximate these relationships. It may be that reasonable devitations from theoretically ideal relationships will, for convenience or some other reason, also be present. It is to be understood that the invention technique may be so employed with an expected and proportional deviation from frequency independent compensation.

In this regard I have discovered that when $$Z_1Z_2=Z_1'Z_2\neq Z_0^2$$

a solution yielding improved if not optimum performance may be obtained by solving for the length parameters in terms of impedance quantities based on the relationship:

$$S_2=\frac{16S_1\sqrt{K_1}}{\pi\sqrt{K_2}}\tan^{-1}[M\pm M^2+1] \qquad \text{(Equation 4)}$$

where $$\tan \beta_2S_2=M+\sqrt{M^2}+1$$

and where $$M=\frac{1-P^2-Q^2}{2p} \qquad \text{(Equation 5)}$$

$$P=\left(\frac{Z_0^2-Z_1^2}{Z_0^2+Z_1^2}\right)\left(\frac{Z_2}{Z_1}\right) \qquad \text{(Equation 6)}$$

and $$Q=\frac{2Z_0Z_2}{Z_0^2+Z_1^2} \qquad \text{(Equation 7)}$$

As can be discerned the foregoing can be expressed as a solution for $S_1$ in terms of $S_2$, if $S_2$ is known or selected, as in the previous examples.

As a final demonstration of the technique of the invention, reference is made to FIGURES 5*a*–5*c* which show in detail a coaxial connector of the MSO type presently being used in industry. This connector has been compensated in accordance with the invention technique where $$Z_1Z_2=Z_1'Z_2\neq Z_0^2$$

As will be apparent the connector joins two cables 80 together. Each cable is comprised of a stranded center conductor 82 surrounded by a solid dielectric sheath 84 and a braided outer conductor 86 overcovered with a protective sheath 88. The connector shown as 90 includes plug and jack halves which are electrically identical and which differ mechanically only in providing a physical intermating with some overlap of dielectric and metallic structure.

The plug and jack halves shown respectively as 92 and 94 each include a body portion such as 96 into which is fitted a core portion shown as 98. As indicated in FIGURE 5A the core portion is comprised of an outer metallic shell having in the center a flange portion 100 carrying flats thereon to permit 98 to be threaded into 96. To the left of the flange portion 100 is a rear sleeve extension shown as 102 having grooves on the outer surface thereof to receive the braid outer conductor 86 of the cable. The end of 102 is beveled as at 104 to facilitate insertion into the cable. A crimping ferrule shown as 106 is provided for each core and is fitted over the extension 102 and crimped downwardly shown in FIGURE 5*a* to terminate the cable outer conductor to the core and in turn to the connector. The interior bore shown as 108 of the sleeve extension 102 is controlled in diameter to provide a characteristic impendance slightly higher than that of the characteristic impedance of the cable. In the particular MOS type connector depicted in FIGURE 5*a* the cable of use has a characteristic impedance $Z_0=50$ ohms. The forward portion of core 98 is externally threaded as shown at 112 to mate with an internal threading of the housing 92. The interior bore of the forward portion 110 is enlarged as shown to accommodate a center contact member shown as 114 carried therein in a dielectric insert shown as 116. The contact member 114 includes a very slight tang shown as 118 which in biting into the insert prevents forward axial movement of the contact member. A slight step in the dielectric insert 116 is provided as shown at 119 to accommodate the end of the cable dielectric sheath 84 for improving voltage breakdown characteristics. The forward end of the insert is relieved radially as at 120 for adjustment of effective dielectric constant.

The body of the plug half 96 includes on the outer surface thereof threading shown as 122 adapted to mate with a nut internally threaded and carried on the plug half 94. The interior bore portion of the body is relatively smooth and of constant diameter except for small recess shown as 124 which serves to anchor the dielectric insert 126 carried within the body. The insert 126 is relieved as at 128 and 132 for the purposes of adjusting the effective dielectric constant. The forward end of the insert is made to extend slightly out of the forward end of the body as at 134 in order to provide an over lapcovering the abutment of the plug and jack halves. The contact member 114 is made to extend through 128 and to be supported by inwardly directed portions shown as at 138 coaxially of the body.

As can be discerned the jack half contains a structure identical to that of the plug half except for the intermating portions of the body and insert and contact members.

In the MSO example, $Z_0=50\Omega$ for the cable and the specification required mating portions of dimensions so that the mating ends of the plug of jack halves be of a $Z_0=50\Omega$. For design reasons, $Z_1$ was fixed at $53.265\Omega$, $Z_2$ was $48.101\Omega$ making $Z_1 Z_2=2562.1\Omega^2$, not equal to $Z_0^2$. For design reasons, the dielectric material and diameters in various segments make $K_1=1.969$, $K_2=1.905$ and $K_1'=1.554$.

To compensate in accordance with the invention $S_1$ was selected at $S_1=0.1965$ inch to provide an adequate length for the rear sleeve extension to support the crimping ferrule and to provide for the flange 100 and the overlap compensation within the flange. This compensation was made to $Z_1$, rather than to $Z_0$ and in accordance with my previously mentioned application S.N. 276,714. The length $S_3$ calculated for $C_1$ made to equal $C_2$ equal to 0.00854 mmf. (compensated at $f=10$ gHz. to provide $S_3=0.0095$ inch).

As previously mentioned, with the lengths $S_3$ compensated to $Z_1$ we may treat the whole length $S_1$ as being of characteristic impedance $Z_1$. In accordance with the invention $Z_1'$ was made equal to $Z_1$, $Z_1'=53.265\Omega$. Utilizing Equations 5, 6 and 7 the following quantities were calculated; $M=-1.617$, $P=-0.05705$ and $Q=0.9012$, $\tan \beta_2 S_2=0.2842$, $\beta_2 S_2=15.866°$. From this, $S_2$ was found to be 0.1408 inch and from $$S_1'=\frac{S_1\sqrt{K_1}}{\sqrt{K_1}}$$

$S_1'=0.2212$ inch.

The jack half 94 and the connector of FIGURE *5a* is similarly dimensioned and compensated. The FIGURES *5b* and *5c* depict the foregoing values for S and Z.

It is contemplated that in the manner above demonstrated the invention technique can be used with one or more discontinuity capacitances being included anywhere in the compensated ensemble with compensation therefor to the appropriate section characteristic impedance. This includes the first or center segment and it, of course, includes discontinuity capacitances located within, between or at the outboard boundaries of the whole compensating ensemble.

Having now disclosed my invention in terms intended to enable a preferred practice thereof, I define it through the appended claims.

What is claimed is:

1. In a high frequency coaxial device for use in a coaxial transmission path of characteristic impedance $Z_0$, a first segment of characteristic impedance $Z_2$ different from $Z_0$, electrical length $S_2$ and effective dielectric constant $K_2$, second and third segments, one on each side of said first segment and of charatceristic impedances $Z_1$, $Z_1'$, electrical lengths $S_1$, $S_1'$ and effective dielectric constants $K_1$, $K_1'$, the said segment parameters being adjusted so that:

$$Z_1Z_2=Z_1'Z_2=Z_0^2$$

and $$S_1\sqrt{K_1}=S_2\sqrt{K_2}=S_1'\sqrt{K_1'}$$

2. The device of claim 1 wherein $Z_1$ and $Z_1'$ are higher than $Z_0$.

3. The device of claim 1 wherein $Z_1$ and $Z_1'$ are lower than $Z_0$.

4. The device of claim 1 wherein $S_1$ is equal to $S_1'$.

5. The device of claim 1 wherein $S_1$ is different from $S_1'$ with the equality $S_1\sqrt{K_1}=S_1'\sqrt{K_1'}$ being effected by an adjustment of $K_1$ relative to $K_1'$.

6. The device of claim 1 wherein each of said segments includes an outer conductor inner diameter and an inner conductor outer diameter substantially equal to each other and said characteristic impedances, lengths and effective dielectric constants are each of substantially constant values extending along each segment.

7. The device of claim 1 wherein at least a distinct discontinuity capacitance exists at the boundary or within at least one of said segments and said discontinuity capacitance is compensated to the characteristic impedance of said segment.

8. The device of claim 1 wherein at least a pair of discontinuity capacitances exist at the boundary or within at least one of said segments and said discontinuity capacitances are compensated to the characteristic impedance of said segment.

9. In a method of compensating high frequency coaxial devices to a coaxial transmission path of characteristic impedances $Z_0$ where said device includes a first segment of characteristic impedance $Z_2$, length $S_2$ and effective dielectric constant $K_2$ the steps including providing a second segment on one side of the first segment of characteristic impedance $Z_1$, length $S_1$ and effective dielectric constant $K_1$ with either $Z_1$ or $Z_2$ being selected and the remaining parameters calculated from $Z_1Z_2=Z_0^2$ and with either $S_1$ or $S_2$ and either $K_1$ or $K_2$ being selected and the remaining parameters calculated from $S_1\sqrt{K_1}=S_2\sqrt{K_2}$, and providing a third segment on the other side of the first segment of $Z_1'=Z_1$ with $S_1'\sqrt{K_1'}=S_1\sqrt{K_1}$.

10. The method of claim 9 wherein one or more of said segments includes at least one discontinuity capacitance and said discontinuity capacitance is compensated to the characteristic impedance of said segment.

References Cited

UNITED STATES PATENTS

| | | | |
|---|---|---|---|
| 2,540,012 | 1/1951 | Salati | 333—97 |
| 3,323,083 | 5/1967 | Ziegler | 333—97 |
| 3,350,666 | 10/1967 | Ziegler | 333—97 |

HERMAN KARL SAALBACH, Primary Examiner

L. ALLAHUT, Assistant Examiner

U.S. Cl. X.R.

333—97; 339—178